United States Patent
Song et al.

(10) Patent No.: US 8,630,075 B2
(45) Date of Patent: Jan. 14, 2014

(54) PROTECTION CIRCUIT FOR CENTRAL PROCESSING UNIT

(75) Inventors: Yong-Jun Song, Shenzhen (CN);
Xing-Long Teng, Shenzhen (CN);
Yong-Zhao Huang, Shenzhen (CN)

(73) Assignees: Hong Fu Jin Precision Industry (ShenZhen) Co., Ltd, Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 385 days.

(21) Appl. No.: 13/198,849

(22) Filed: Aug. 5, 2011

(65) Prior Publication Data

US 2012/0293901 A1 Nov. 22, 2012

(30) Foreign Application Priority Data

May 18, 2011 (CN) .......................... 2011 1 0129126

(51) Int. Cl.
*H02H 7/00* (2006.01)
(52) U.S. Cl.
USPC ........................................... 361/78

(58) Field of Classification Search
USPC ........................................... 361/78
See application file for complete search history.

(56) References Cited

U.S. PATENT DOCUMENTS

| | | | | |
|---|---|---|---|---|
| 7,366,929 B1 * | 4/2008 | Mimberg | ....................... | 713/310 |
| 8,054,316 B2 * | 11/2011 | Azar et al. | ..................... | 345/589 |
| 8,321,696 B2 * | 11/2012 | Chueh et al. | .................. | 713/300 |

* cited by examiner

*Primary Examiner* — Stephen W Jackson
(74) *Attorney, Agent, or Firm* — Altis Law Group, Inc.

(57) ABSTRACT

A protection circuit includes a coding chip, a digital-to-analog converter (DAC), and a control circuit. The coding chip receives parallel voltage identification definition (PVID) signals or serial voltage identification definition (SVID) signals from a central processing unit (CPU), and converts the PVID signals or the SVID signals to voltage identification definition (VID) signals. The DAC receives the VID signals from the coding chip, and converts the VID signals to an analog voltage. The control circuit receives the analog voltage from the DAC and a voltage received by the CPU, and compares the analog voltage from the DAC with the voltage received by the CPU. When the voltage received by the CPU is greater than the analog voltage from the DAC, the control circuit disconnects the CPU from a first power supply.

4 Claims, 4 Drawing Sheets

US 8,630,075 B2

PROTECTION CIRCUIT FOR CENTRAL PROCESSING UNIT

BACKGROUND

1. Technical Field

The present disclosure relates to a protection circuit for a central processing unit (CPU).

2. Description of Related Art

CPU core voltages (usually labeled $V_{CORE}$) are power supply voltages supplied to CPUs. When a CPU is used at startup, a pulse-width modulation (PWM) controller receives a voltage identification (VID) code from a number of VID pins of the CPU, and then outputs a corresponding PWM signal according to the VID code to a voltage regulation module (VRM). The VRM provides a required constant CPU core voltage to the CPU according to the VID code.

However, when the PWM controller is unstable or damaged, a voltage received by the CPU may be greater than the voltage corresponding to the VID code. As a result, the CPU may be damaged.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
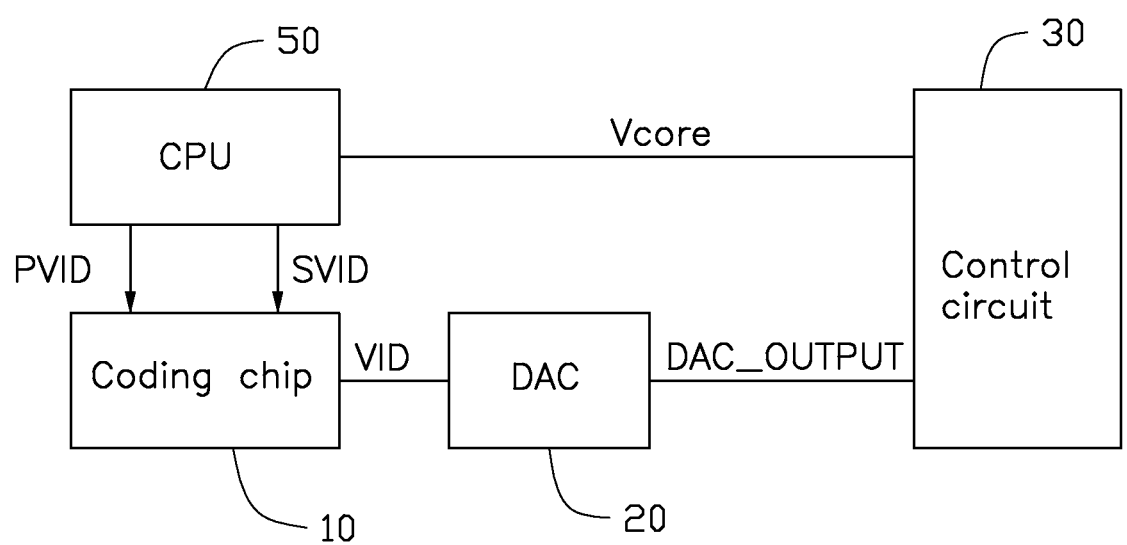
FIG. 1 is a block diagram of an exemplary embodiment of a protection circuit including a coding chip, a digital-to-analog converter (DAC), and a control circuit.

Referring to FIG. 1, an exemplary embodiment of a protection circuit for a central processing unit (CPU) 50 includes a coding chip 10, a digital-to-analog converter (DAC) 20, and a control circuit 30.

The coding chip 10 receives parallel voltage identification definition (PVID) signals or serial voltage identification definition (SVID) signals from the CPU 50. The coding chip 10 further converts the PVID signals or the SVID signals to voltage identification definition (VID) signals, which can be identified by the DAC 20. The DAC 20 converts the VID signals from the coding chip 10 to an analog voltage DAC_OUTPUT. The control circuit 30 compares the analog voltage DAC_OUTPUT with a voltage Vcore received by the CPU 50. When the voltage Vcore received by the CPU 50 is greater than the analog voltage DAC_OUTPUT, the control circuit 30 disconnects a first power supply +12V_VRM from the CPU 50.

Figure 2:
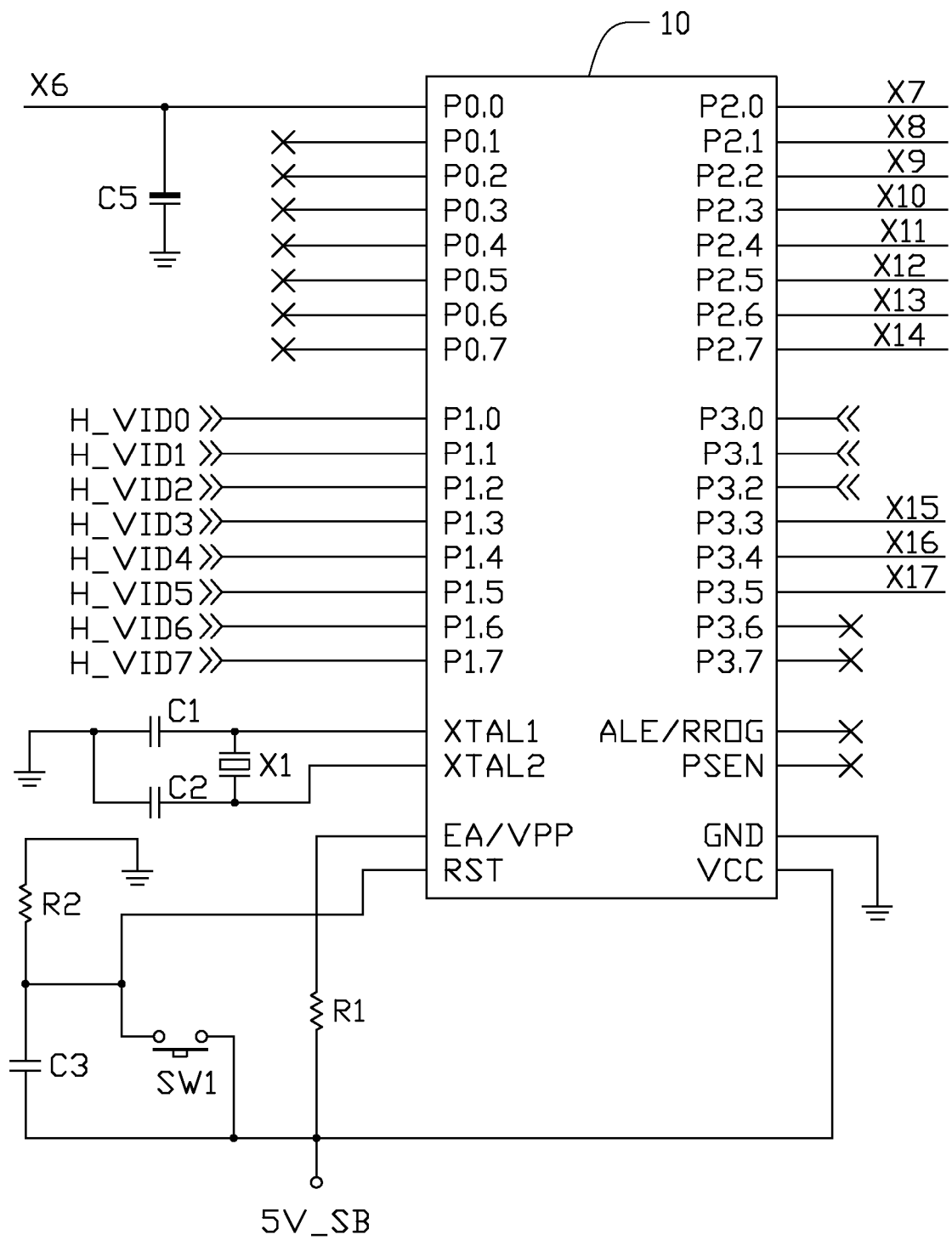
FIG. 2 is a circuit diagram of the coding chip of FIG. 1.

Referring to FIG. 2, the coding chip 10 is an AT89C51 chip. An oscillator input XTAL1 of the coding chip 10 is connected to a first terminal of a crystal X1. An oscillator output XTAL2 of the coding chip 10 is connected to a second terminal of the crystal X1. The first terminal of the crystal X1 is further grounded through a capacitor C1. The second terminal of the crystal X2 is further grounded through a capacitor C2. An external access terminal EA/VPP of the coding chip 10 is connected to a second power supply 5V_SB through a resistor R1. A reset terminal RST of the coding chip 10 is connected to a first terminal of a switch SW1. The first terminal of the switch SW1 is further connected to the second power supply 5V_SB through a capacitor C3, and is grounded through a resistor R2. A second terminal of the switch SW1 is connected to the second power supply 5V_SB. The crystal X1 provides clock signals to the coding chip 10. The switch SW1 is used to reset the coding chip 10.

A power terminal VCC of the coding chip 10 is connected to the second power supply 5V_SB. A ground terminal GND of the coding chip 10 is grounded. An address latch terminal ALE/PROG and a program terminal PSEN of the coding chip 10 are idle.

The coding chip 10 further includes a first group of input/output terminals P0.0-P0.7, a second group of input/output terminals P1.0-P1.7, a third group of input/output terminals P2.0-P2.7, and a fourth group of input/output terminals P3.0-P3.7. The input/output terminal P0.0 of the first group of input/output terminals is connected to the DAC 20, and is grounded through a capacitor C5. The input/output terminals P0.1-P0.7 of the first group of input/output terminals are idle.

The second group of input/output terminals P1.0-P1.7 are connected to the voltage identification definition (VID) pins of the CPU 50 to receive the PVID signals from the CPU 50. The third group of input/output terminals P2.0-P2.7 are connected to the DAC 20. The input/output terminals P3.0-P3.2 of the fourth group of input/output terminals are connected to the VID pins of the CPU 50 to receive the SVID signals of the CPU 50. The input/output terminals P3.3-P3.5 of the fourth group of input/output terminals are connected to the DAC 20. The input/output terminals P3.6 and P3.7 of the fourth group of input/output terminals are idle.

Figure 3:
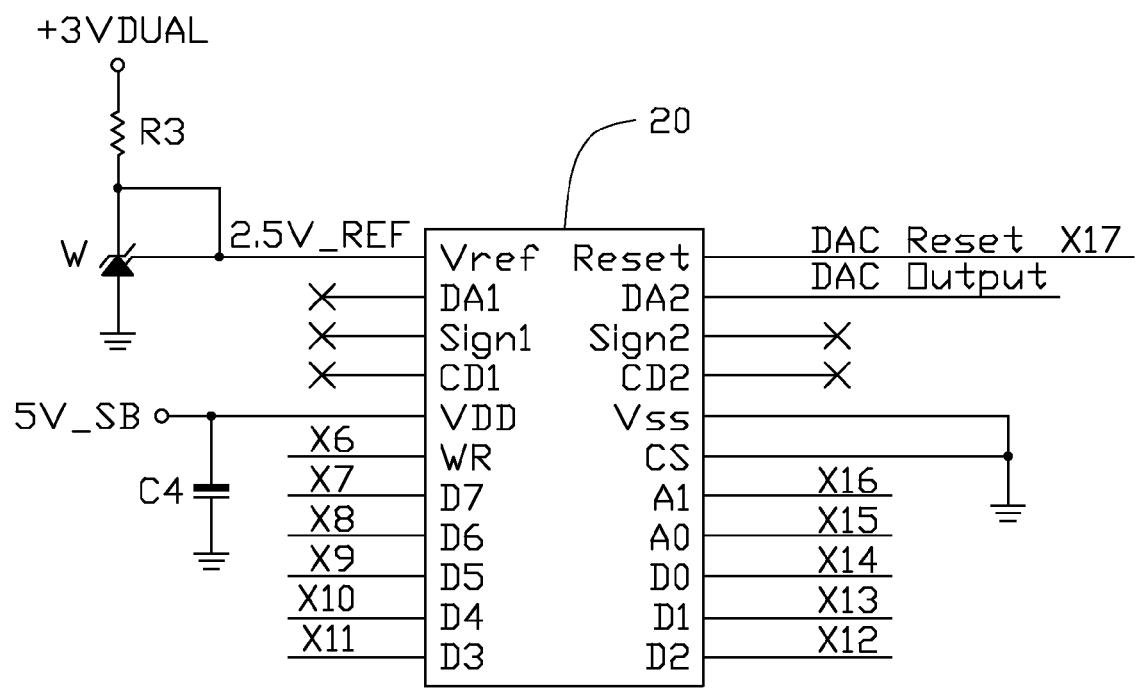
FIG. 3 is a circuit diagram of the DAC of FIG. 1.

Referring to FIG. 3, the DAC 20 is an NJY39610 chip. A power terminal VDD of the DAC 20 is connected to the second power supply 5V_SB, and is grounded through a capacitor C4. A reference voltage input terminal Vref is connected to a reference voltage +2.5V_REF. The reference voltage input terminal Vref is further connected to a first terminal of a resistor R3. A second terminal of the resistor R3 is connected to a dual voltage +3.3VDUAL. The first terminal of the resistor R3 is further connected to a cathode of a silicon controlled rectifier W. An anode of the silicon controlled rectifier W is grounded. A control terminal of the silicon controlled rectifier W is connected to the reference voltage input terminal Vref of the DAC 20.

A first output terminal DA1, two mark terminals Sign 1 and Sign 2, and two current decay terminals CD1 and CD2 of the DAC 20 are idle. A write terminal WR of the DAC 20 is connected to the input/output terminal P0.0 of the coding chip 10. Data terminals D0-D7 of the DAC 20 are respectively connected to the third group of input/output terminals P2.7-P2.0 of the coding chip 10.

A select terminal CS is connected to a ground terminal Vss of the DAC 20. A reset terminal Reset of the DAC 20 is connected to the input/output terminal P3.5 of the coding chip 10. A second output terminal DA2 of the DAC 20 is connected to the control circuit 30.

Figure 4:
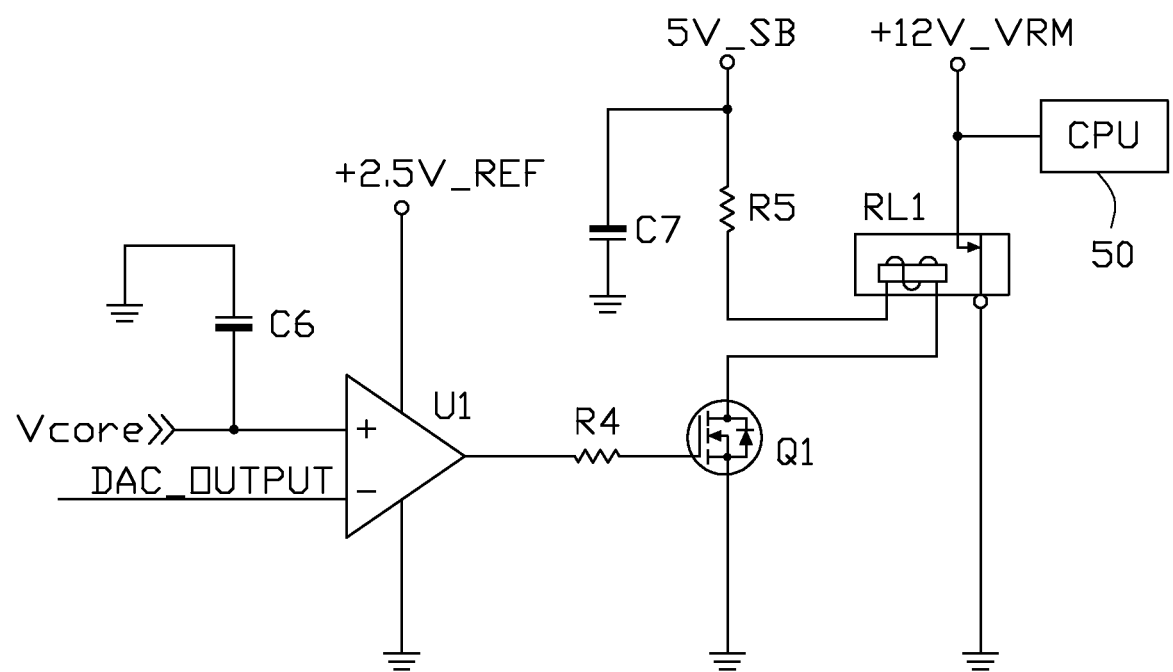
FIG. 4 is a circuit diagram of the control circuit of FIG. 1.

Referring to FIG. 4, the control circuit 30 includes a comparator U1. A non-inverting terminal of the comparator U1 is connected to the CPU 50 to receive the voltage Vcore. The non-inverting terminal of the comparator U1 is further grounded through a capacitor C6. An inverting terminal of the comparator U1 is connected to the second output terminal DA2 of the DAC 20. A power terminal of the comparator U1 is connected to the reference voltage +2.5V_REF. A ground terminal of the comparator U1 is grounded.

An output terminal of the comparator U1 is connected to a gate of a metal oxide semiconductor field effect transistor (MOSFET) Q1 through a resistor R4. A source of the MOSFET Q1 is grounded. A drain of the MOSFET Q1 is connected to a first terminal of a roil of a relay RL1. A second terminal of the roil is connected to the second power supply 5V_SB through a resistor R5. The second power supply 5V_SB is grounded through a capacitor C7. A first terminal of a switch of the relay RL1 is connected to the first power supply +12V_VRM.

The coding chip 10 receives the PVID signals or the SVID signals from the CPU 50, and converts the PVID signals or the SVID signals to the VID signals which can be identified by the DAC 20. In this embodiment, the coding chip 10 can be programmed to convert the PVID signals or the SVID signals to the VID signals.

The DAC 20 receives the VID signals from the coding chip 10, and converts the VID signals to the analog voltage DAC_OUTPUT. The analog voltage DAC_OUTPUT is inputted to the inverting terminal of the comparator U1. The non-inverting terminal of the comparator U1 receives the voltage Vcore received by the CPU 50.

The comparator U1 compares the analog voltage DAC_OUTPUT with the voltage Vcore received by the CPU 50. When the voltage Vcore received by the CPU 50 is greater than the analog voltage DAC_OUTPUT, in other words, the voltage Vcore received by the CPU 50 is greater than a voltage that should be supplied to the CPU 50, a power circuit of the CPU 50 may not be operating properly. At this time, the comparator U1 outputs a high level signal. The MOSFET Q1 is turned on. The switch of the relay RL1 is turned on. As a result, the first power supply +12V_VRM which supplies power for the CPU 50 is grounded, thus damages to the CPU 50 can be avoided.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A protection circuit for a central processing unit (CPU), the protection circuit comprising:
   a coding chip to receive parallel voltage identification definition (PVID) signals or serial voltage identification definition (SVID) signals from the CPU, and convert the PVID signals or the SVID signals to voltage identification definition (VID) signals;
   a digital-to-analog converter (DAC) to receive the VID signals from the coding chip, and convert the VID signals to an analog voltage; and
   a control circuit to receive the analog voltage from the DAC and a voltage received by the CPU, and compare the analog voltage from the DAC with the voltage received by the CPU;
   wherein when the voltage received by the CPU is greater than the analog voltage from the DAC, the control circuit disconnects the CPU from a first power supply.

2. The protection circuit of claim 1, wherein the control circuit comprises a comparator, a metal oxide semiconductor field effect transistor (MOSFET), and a relay, wherein a non-inverting terminal of the comparator receives the voltage received by the CPU, an inverting terminal of the comparator receives the analog voltage from the DAC, an output terminal of the comparator is connected to a gate of the MOSFET, a source of the MOSFET is grounded, a drain of the MOSFET is connected to a first terminal of a coil of the relay, a second terminal of the coil is connected to a second power supply through a resistor, a first terminal of a switch of the relay is connected to the first power supply, a second terminal of the switch is grounded.

3. The protection circuit of claim 1, wherein the coding chip is an AT89C51 chip, the coding chip comprises first to fourth groups of input/output terminals, a first input/output terminal of the first group of input/output terminals is connected to the DAC, the second group of input/output terminals are connected to voltage identification definition (VID) pins of the CPU to receive the PVID signals, the third group of input/output terminals are connected to the DAC to output the VID signals to the DAC, first to third input/output terminals of the fourth group of input/output terminals are connected to the VID pins of the CPU to receive the SVID signals.

4. The protection circuit of claim 1, wherein the DAC is an NJU39610 chip, a data terminal of the DAC is connected to the coding chip to receive the VID signals from the coding chip.

* * * * *